United States Patent [19]

Tohms

[11] 4,182,454

[45] Jan. 8, 1980

[54] SECURITY STAND FOR MOTORCYCLE

[76] Inventor: Gary R. Tohms, 3501 W. 118th St., Cleveland, Ohio 44111

[21] Appl. No.: 890,602

[22] Filed: Mar. 20, 1978

[51] Int. Cl.$^2$ ............................................. E05B 73/00
[52] U.S. Cl. ......................................... 211/5; 70/235; 70/417
[58] Field of Search .............................. 211/5, 17–22; 248/203, 499; 70/235, 234, 233, 225, 227, 417; 52/106, 297, 725

[56] References Cited

U.S. PATENT DOCUMENTS

| | | | |
|---|---|---|---|
| 1,202,444 | 10/1916 | Solean | 70/234 X |
| 3,793,794 | 2/1974 | Archer et al. | 52/725 X |
| 3,820,662 | 6/1974 | Steers | 70/417 X |
| 3,863,767 | 2/1975 | Garwood | 211/5 |
| 3,944,079 | 3/1976 | Boslough | 211/5 |
| 3,970,197 | 7/1976 | Bale, Jr. | 211/5 |
| 3,976,434 | 8/1976 | Shwayder | 70/417 X |

FOREIGN PATENT DOCUMENTS

2329503  5/1977  France .......................... 211/20

*Primary Examiner*—William E. Lyddane
*Attorney, Agent, or Firm*—Alfred D. Lobo

[57] ABSTRACT

A security stand is provided which secures a motorcycle and each of its major, valuable components against theft. The stand does not utilize a padlock or chain either of which can be attacked by acid, quickly supercooled and embrittled by a cryogen, or easily cut with an oxyacetylene torch. The stand does utilize an internal locking means such as a dead bolt, which engages the ends of cross bar pipes necessarily containing cementitious material, which pipes are inserted in passages through a pair of angulated arms. The arms extend upwardly from a base, and, preferably both arms and base are also filled with cementitious material. The angulation of the arms is such that they do not provide a horizontal surface against which a hydraulic jacking means may be biased in cooperation with the base, or ground upon which the base is disposed. The cross bar pipes function as locking members when they are inserted through openings between the frame and engine of the motorcycle and locked in the arms. Plural pipes are preferably used, each of which may be locked with a separate locking means. The stand of this invention, as assembled for use, is simple, requiring an internal, concealed key actuated locking means and only three structural components, namely a base, angulated arms and elongated hollow locking members, and preferably each of the components is filled with cementitious material. The filling of cementitious material provides several functions: (a) it provides a reservoir of heat to counter the effect of a cryogen poured on the locking member, (b) it decrepitates under the intense heat of a cutting torch, (c) it dulls a metal-cutting hacksaw blade, and (d) it provides weight to anchor the structural components of the stand.

8 Claims, 7 Drawing Figures

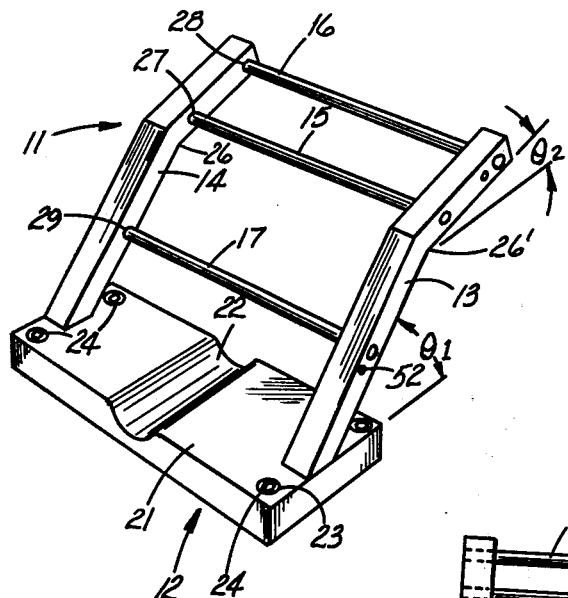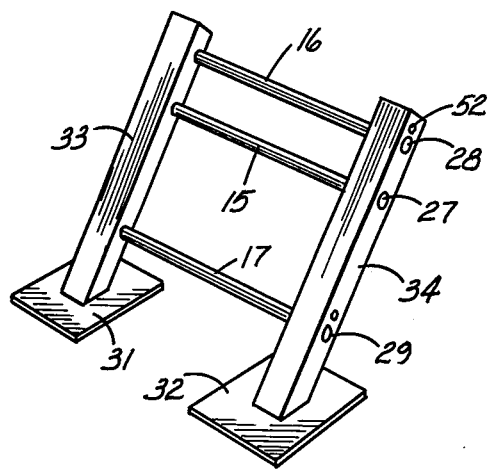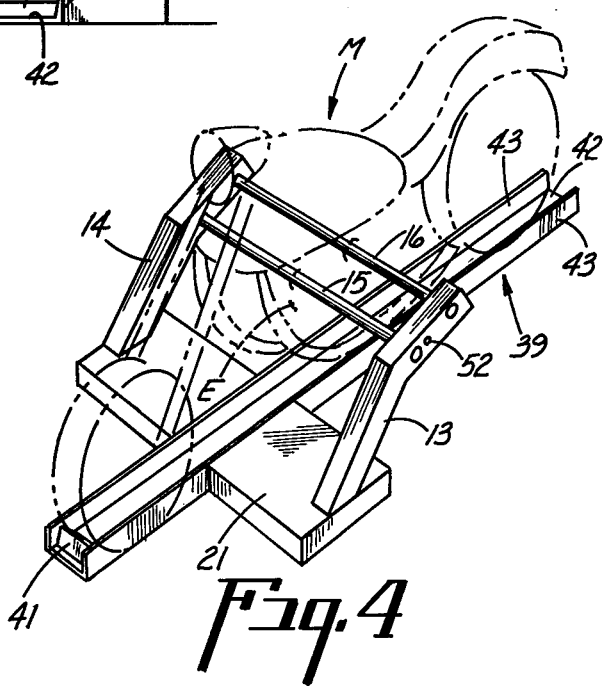

SECURITY STAND FOR MOTORCYCLE

BACKGROUND OF THE INVENTION

The spur of the moment theft of a motorcycle or bicycle, by an occasional malevolent or impecunious miscreant in a schoolyard, has long since been supplanted by the organized theft of mainly the most desirable motorcycles, by determined, if not professional thieves. This invention is particularly directed to a security stand for motorcycles, not only because they are generally more expensive than bicycles, but because the most stealable motorcycles are heavy, and have a front fork in which heavy springs bias the front wheel so strongly that theft of even just the front wheel is impractical when the motorcycle is locked in the stand of this invention. As will presently be apparent, this would not be true for removal of just the front wheel of a bicycle locked in this stand, even though the frame of the bicycle was locked. Moreover, considering the fact that this stand is neither inexpensive, nor portable once it is assembled, its use will be limited to the locking of only the most valuable motorcycles, such as are commonly deemed by intrepid thieves to be worth the risk of being apprehended and convicted.

Owners of high-priced motorcycles are only too well aware of the fact that a skilled and well-equipped thief requires less than sixty seconds to steal their prized motorcycles. When such a thief has assistance, the time required is even less, with the added factor that two strong and able-bodied thieves can lift up a motorcycle not secured to the ground and place it in a van, even if both its wheels are locked.

It should be borne in mind that the thief for whom this invention is conceived, can steal a motorcycle no matter how carefully it is secured, if the thief is given more than sixty seconds of reasonably assured quiet and inattention. Under such a circumstance, even a heavy chain such as is diagrammatically illustrated in U.S. Pat. No. 3,881,680 presents no serious obstacle to a cutting torch, even if one ignores the fact that the conventional padlock shown would almost certainly be more vulnerable than the chain. As recognized in U.S. Pat. No. 3,863,767, a padlock is generally most vulnerable, being easily defeated by acid poured into the lock, or frozen by a cryogen, until the hasp is brittle, and then fractured (see middle of Col. 7). These now "standard tampering techniques" are favored because they are quiet and quick, and do not require carrying a miniature oxy-acetylene or similar torch, or other specialized tools, the possession of which may be a little difficult to explain to law enforcement authorities.

As has been stated, and as will be readily recognized, a proficient thief, given enough time, can mount a determined assault on any security stand and force it to yield its prize. A stand deemed successfully secure, would be one which dissuades such an assault in the first place. The best security stand is the untouched stand. If the stand does not always succeed in dissuading such an assault, it should make it eminently evident that a successful assault will necessitate more time than a thief might reasonably plan to allot, and the assault will necessarily be more noisy than the thief had anticipated. Finally, it should be apparent to the thief that even a successful high-risk assault on the stand presents so great a risk that the motorcycle will be damaged, that, on balance, he is dissuaded from making the assault.

As self-evident as the foregoing observations may appear, it is apparent that they are not used as the principal guiding tenets in the design of most prior art security stands. For example, U.S. Pat. No. 3,942,646 shows a hollow plastic insert in a cast concrete block, and a bicycle secured thereto by means of a chain and padlock which clearly do not pretend to afford more than a modicum of invulnerability. In contrast, U.S. Pat. No. 3,881,680 utilizes a heavy chain and a padlock. Obviously, a link of a heavy chain takes longer to cut or freeze than a link of a light chain. But a thief attacks the weakest link in a security system. Neither of the foregoing devices significantly dissuades an assault, and each is susceptible to embrittlement by freezing with a cryogen, or to destruction by acid poured into the lock. Only U.S. Pat. No. 3,863,767 provides reasonable protection against a competent thief, and it does so for a bicycle utilizing steel members, in a manner which does not make the stand readily usable for a motorcycle in which an engine is mounted in the frame. It is unnecessary to consider locking stands from the days prior to modern day determination in thievery, such as the stand disclosed in U.S. Pat. No. 1,202,444 which stand can be defeated with a makeshift hacksaw, or a blow with a heavy hammer.

SUMMARY OF THE INVENTION

This invention relates to a stand for a motorcycle held upright therein. The stand in cooperation with elongated, cement-filled members locks the motorcycle in the stand without the use of a padlock or chain.

It is a general object of this invention to provide a security stand for a motorcycle which presents an immediate visual indication, particularly to a proficient thief, that the stand will defy theft of the motorcycle in any reasonably short period of time.

It is another general object of this invention to provide a security stand for a motorcycle, in which stand the locking member is a metal tube or pipe filled with cementitious material which decrepitates when subjected to intense heat, such as that of a cutting torch, yet provides a reservoir of heat energy with which to counter the embrittling effect of a cryogen.

It is a specific object of this invention to provide a security stand for a motorcycle which stand includes a metal base preferably filled or otherwise anchored with cementitious material; a pair of upwardly extending, generally parallel angulated arms preferably filled with cementitious material, with through passages in the arms; and elongated hollow locking members, hereafter referred to as "locking pipes" for convenience, necessarily filled with cementitious material.

It is also a specific object of this invention to provide an internal locking means such as a dead bolt locking structure, within one or both of the arms, which locking structure is concealed and difficult to defeat.

It is yet another specific object of this invention to provide a security stand which, because of its angular configuration, does not readily lend itself to being destroyed by a hydraulic or other jacking means without seriously damaging the motorcycle.

These and other objects and advantages of the invention will be apparent to those skilled in the art from the following detailed description of the best modes of carrying out the invention, and the manner of making and using the same, as evidenced by preferred embodiments thereof illustrated in the accompanying drawings.

BRIEF DESCRIPTION OF THE DRAWINGS

FIG. 1 is a perspective view of one preferred embodiment of security stand in which a motorcycle is locked in an upright position.

FIG. 2 is a perspective view of another preferred embodiment of the security stand.

FIG. 3 is a perspective view of still another preferred embodiment of the security stand.

FIG. 4 is a perspective view of the most preferred embodiment of the security stand having a central channel guide for locating the motorcycle.

FIG. 5 is an end elevational front view of FIG. 4, showing a slight inclination of the locking members due to positioning of one of two arms of the stand, as seen facing the direction in which the motorcycle is inserted between the arms.

DETAILED DESCRIPTION OF A PREFERRED EMBODIMENT

Figure 6:
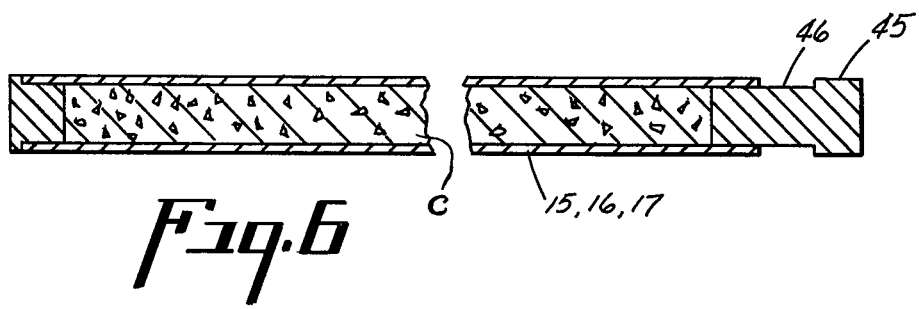
FIG. 6 is a detail cross sectional view, with the central portion broken away, of one of the locking members showing a locking member having one end adapted to be secured by a dead bolt locking means.

The security stand of this invention is specifically adapted for use to secure a valuable motorcycle. The stand may be modified depending on the particular structural configuration of the motorcycle to be secured therein, as will be evident from the description hereinafter.

Referring to FIG. 1, the security stand of this invention, generally designated by reference numeral 11, comprises a base generally designated by reference numeral 12, a pair of angulated upwardly extending arms generally designated by reference numerals 13 and 14, and at least one elongated locking member, or locking pipe, and more preferably two and sometimes three locking pipes, generally designated by reference numerals 15, 16, and 17 insertable in the arms so that the pipes may be locked in the arms.

The member 12 comprises a relatively short horizontally disposed base slab 21. The base slab 21 is preferably hollow, and of rectangular cross-section, formed of steel plate. A groove 22 extends axially across the surface of the base slab to facilitate pushing the front wheel of a motorcycle over the base slab 21. One or both ends of the base slab 21 may be open, and cement or concrete is cast within the slab.

Concrete is inexpensive and a preferred material, but any other cementitious material may be used, which material is heavy, includes physically and chemically bound moisture, and which decrepitates when subjected to intense local heat. Concrete, when put to the torch, not only emits a series of minor explosive sounds which attract attention, but provides weight. Due to the bound moisture, concrete also provides a large reservoir of heat which it gives up to the metal in which it is encased, if a cryogen is poured on the metal. Further, concrete has an immediate dulling effect on a metal-cutting hacksaw blade.

The base slab 21 is preferably fastened to a concrete parking surface (not shown) such as a concrete garage floor, but the weight of the base slab may be sufficient to make it secure without fastening it to the floor or ground on which it rests. When the base slab 21 is to be fastened to a concrete floor it is provided with spaced apart apertures 23, with countersinks, through which apertures anchor bolts 24 anchor the base slab in conventional concrete anchors in the concrete floor. The heads of the bolts are preferably for an Allen wrench, and after the base slab is secured in position, the central socket cavity in the head of the bolt is filled with a metal-filled epoxy resin, lead, cement, or other material so that the head within the counterbore cannot be easily readied to receive an Allen wrench, or be otherwise broken off.

From near opposite ends of the base slab 21 there extend the pair of angulated, upwardly extending arms 13 and 14, which are welded to the base slab 21 or otherwise fixedly secured thereto in laterally spaced apart relationship to accomodate a motorcycle placed between the arms. By "angulated" is meant that each arm is preferably disposed at an angle to the horizontal or X-axis. As illustrated, the arms are doubly angulated, forming an acute angle $\theta_1$ greater than 45° relative to the horizontal at the base slab, and forming an acute angle $\theta_2$ less than 45° relative to the horizontal at elbows 26 and 26' intermediate the length of each arm.

Figure 7:
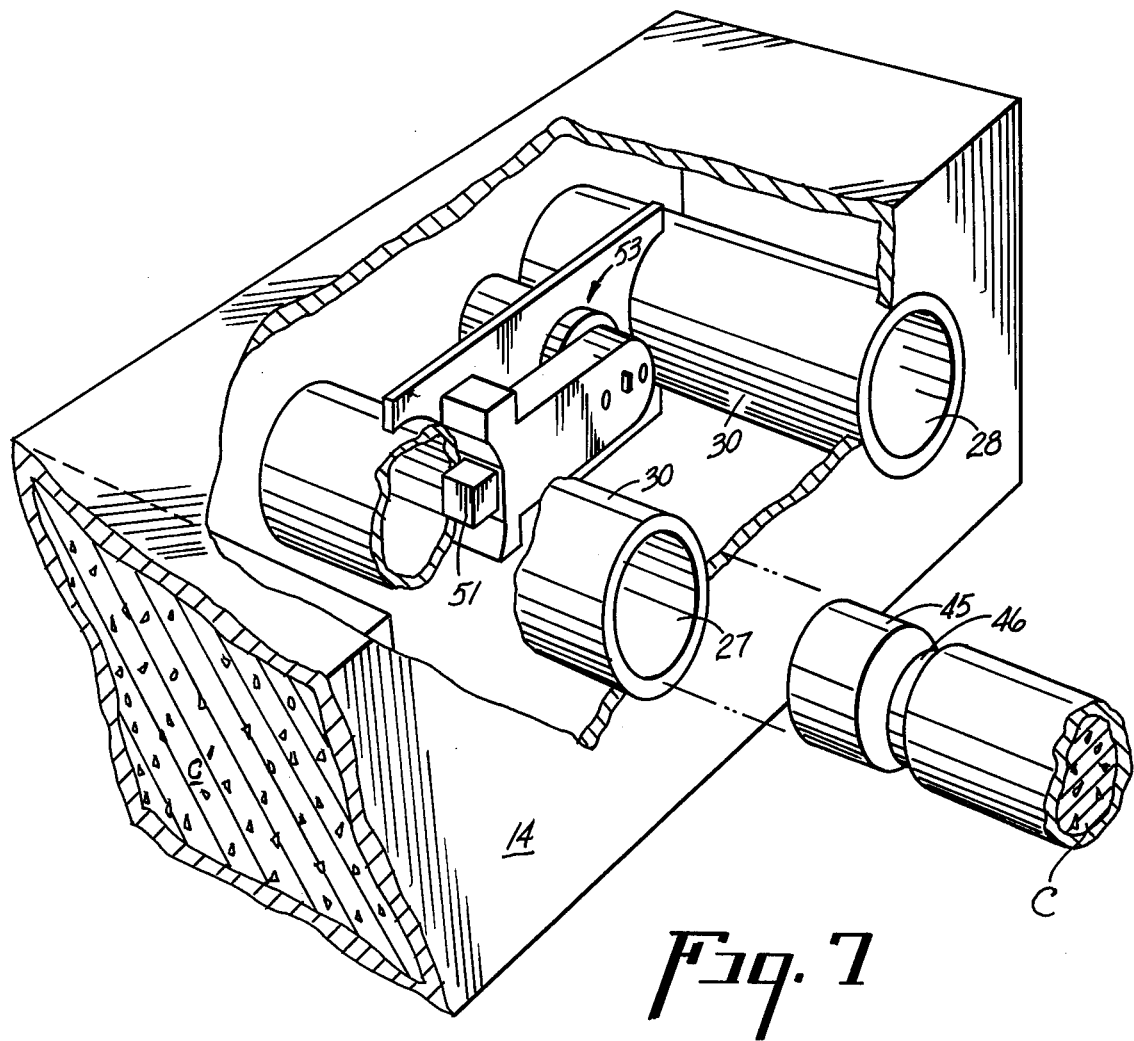
FIG. 7 is a fragmentary detail perspective view, partially in cross-section, showing details of the internal locking structure near one end of an arm of the stand.

Each arm 13 and 14 is preferably formed from a box channel member, or by welding steel angle iron members together to form a hollow support member of generally rectangular cross-section; and each arm is preferably filled with concrete C or other cementitious material. A detail perspective view of an end of an arm 14, with portions broken away for clarity, is shown in FIG. 7.

Each arm is provided with at least one, and preferably plural, transversely spaced apart axial passages 27, 28, and 29. Each of the passages 27, 28, and 29 is formed by welding a hollow cylindrical stub 30 (see FIG. 7) horizontally axially, along the Y-axis, within each arm. The inside diameter of the stub 30 is chosen so as to slidably accommodate an end of the locking pipe to be inserted therethrough, and for convenience all locking pipes are of the same diameter. Depending upon the angulation of the arms and the number of passages provided therein, the stand of this invention adjustably accomodates several models and makes of motorcycles.

Each locking pipe 15, 16, and 17 is conveniently formed by filling a hollow, heavy walled steel pipe (hence, referred to as a locking pipe) with concrete C or other cementitious material. The length of each locking pipe is at least long enough to be inserted through each of the arms 13 and 14, which arms are sufficiently spaced apart along the y-axis so as to accommodate the mid-section, that is, the portion of the motorcycle in which the engine is mounted.

The base slab 21 may also be formed by casting concrete into an open U-channel section of relatively large dimension U-channel stock, for example, one with a 16" wide web and 2" vertical flanges. The base slab may then be used with the web in abutment against a concrete floor to which it is preferably fastened, or upside down, with the cast concrete of the base slab against the concrete floor. In either case the base slab may be securely anchored to the concrete floor by the means described hereinabove, or any other conventional means.

As diagrammatically illustrated in FIG. 2, the base slab may also be incorporated in the concrete floor of a garage or parking space, particularly if the floor is to be part of new construction. This is conveniently accomplished by providing relatively large metal base plates 31 and 32 to which arms 33 and 34 respectively are welded. The base plates 31 and 32 are simply bedded in concrete at a predetermined distance from each other, so as to accommodate a motorcycle to be secured. The angulated arms 33 and 34 are illustrated without an elbow, as shown in FIG. 1, since some motorcycles may be adequately secured with a pair of angulated linear arms, as shown in FIG. 2. Provisions for inserting locking pipes in the arms 33 and 34 are analogous to those made for the embodiment described in FIG. 1 hereinabove.

It will now be evident that the choice of the angle $\theta_1$ at which the arms are inclined to the X-axis, if they are inclined at all, will be determined by the model of the motorcycle to be secured; and, that providing an elbow in each of the arms is a convenient way to make provisions for more than one locking pipe inserted beneath the seat and gasoline tank of the motorcycle to be secured. It will also be evident that a single locking pipe inserted through an opening between the engine E and a frame member of the motorcycle M, may be locked in the ends of a pair of vertical arms, but a single locking pipe may not effectively prevent removal of only the engine. In an embodiment where the angulated arms are vertical, for greater security, two pairs of vertical arms 33,33',34 and 34', may be used as diagrammatically illustrated in FIG. 3, each vertical arm being welded or otherwise fixedly fastened to the base slab 21. As described hereinabove, locking pipes 15 and 16 are inserted through passages 27 and 28 in directly oppositely disposed arms.

Whether the arms of the stand are vertical (FIG. 3) or more preferably angulated (FIG. 2) and still more preferably, doubly angulated (FIG. 1), the number of passages in each arm, and their diameters are so chosen that locking pipes may be used interchangeably therein. More than three passages may be provided in each arm to allow a choice of passages, depending on the model of the motorcycle to be locked in the stand. The stand of this invention is therefore adjustable for different makes and models of motorcycles.

Referring now to FIG. 4, a security stand is illustrated similar to that shown in FIG. 1, but in which is additionally provided a U-shaped channel guide indicated generally by reference numeral 39, to receive the wheels of the motorcycle. Channel guide 39 is not essential since the front wheel of the motorcycle may be simply pushed over the base slab 21, as shown in FIG. 1, which base slab then lies between the front and rear wheels. However, when a channel guide is provided, and it is preferred because it helps locate the motorcycle and is convenient, the channel is blocked at one end by a stop means 41 to limit the travel of the front wheel, the other end of the channel being open to receive the motorcycle as it is rolled therethrough. The channel guide may overlie the base slab at the intersection, or it may be essentially coplanar with the base slab, and orthogonal to it, as shown in FIG. 4.

The U-shaped channel may be a section of commercially available channel stock having a web 42 wide enough to accommodate the wheels of the motorcycle between vertical opposite flanges or sidewalls 43. As illustrated, the channel guide 39 bisects the base slab 21, so that a motorcycle cradled in the channel guide is snugly enough disposed between the angulated arms 13 and 14 to make it impractical to insert and rotate a pipe cutter between the motorcycle and an arm.

Since the base slab 21 may have a thickness of about two inches or more, it is awkward to provide an overlying channel guide, which would present a slight upward incline. This incline would need to be overcome when pushing a motorcycle into position. It is more convenient to provide a horizontal channel guide flush with the floor, as shown in FIG. 4, and to weld one-half of the base slab 21 on each side of the channel guide before each half of the base slab is filled with concrete. This structure is particularly convenient if the channel guide 39 and the base slab 21 are formed from the same channel stock.

It is preferred to rest a motorcycle on its kick stand which is normally provided on one side (usually the left side) of a motorcycle, so that a motorcycle resting on its extended kick stand (not shown), is inclined. To accomodate the inclinedly resting motorcycle, arm 13 is not quite symmetrically disposed in mirror image relationship with respect to arm 14, relative to a vertical (Z-axis) plane midway between the arms, but only approximately so disposed. As illustrated in FIG. 5 which is an end view, from the front of a motorcycle to be secured, looking rearward, the lower portion of arm 13 is inclined from the vertical, approximately corresponding to the inclination of the inclinedly resting motorcycle. Thus passages 27,28 and 29 in each of the arms are not exactly along the Y-axis, but at a slight inclination thereto.

The locking pipes 15, 16, and 17 are preferably only long enough to be inserted and locked in place within the arms, with no appreciable portion of the locking pipes protruding beyond the arms. Though the wall thickness of conventional schedule 80 pipe is heavy enough to permit milling a groove in its outer surface and still provide adequate strength against considerable force exerted against it, it is preferred to provide a locking pipe having a stronger structural element. Therefore as illustrated in FIG. 6, which is a diagrammatic detail of a locking pipe with the intermediate portion broken away, each locking pipe is provided at least at one end with a short length of bar stock 45 in which is milled an annular groove 46 or other detent-receiving recess adapted to receive a conventional detent such as a dead bolt 51, shown in the detail view of FIG. 7 in the position it would engage the groove 46, if the locking pipe was inserted in the steel bushing 30 which forms passage 27. The locking pipes may be additicnally reinforced with an axial steel reinforcing rod (not shown) longitudinally encased in concrete. The dead bolt 51 is operated by a key (not shown) inserted in a key hole 52 of a tumbler assembly 53 which, like the dead bolt 51, is necessarily disposed within the arm to maximize the difficulty of tampering with the locking mechanism successfully. The entire volume within the arm is filled with concrete, which extends in close proximity to the dead bolt 51 itself. Thus maximum security is provided and one using the stand of this invention can be confident of its security. A detailed description of the dead bolt mechanism is unnecessary as it is of conventional design and well-known in the art. Locking means are illustrated and described in U.S. Pat. Nos. 663,488; 1,076,587; 1,077,846; 1,105,980; 1,120,294; 1,239,244; 1,321,298; 3,865,245 inter alia, and references cited therein. It will be evident that the key and cooperating tumbler assembly would desirably be a key-actuated locking means of the kind which is not easily lefeated by any but the most skilled locksmith. Obviously, any other locking means which provides a detent means for releasably engaging the annular groove in the locking pipe, could be used effectively, it being critical only that the key actuated locking means be concealed internally within the end of an arm.

Though a single locking means may be used to secure more than one locking pipe in each arm, it is desirable to utilize a separate locking means for each cross bar, with one locking means in one arm for one cross bar, and the other locking means in the other arm for another cross bar. Where only a single locking pipe is used it is desirable to provide milled bar stock ends at each end of the pipe, and to provide locking means at each end.

I claim:

1. A security stand for a motorcycle having a frame in which an engine is mounted, said stand comprising,
   (a) a base,
   (b) a pair of arms extending upwardly from said base in laterally spaced apart relationship with each other to accommodate said motorcycle between said arms in an upright position, each of said arms having corresponding oppositely disposed passage means through said arms to slidingly accommodate a locking pipe
   (c) at least one elongated locking pipe for insertion through an opening between said engine and a frame member of said mtorocycle to prevent removal of said engine from said frame, in which locking pipe a cementitious material is contained, which cementitious material includes physically and chemically bound moisture and decrepitates when subjected to intense local heat, said elongated locking pipe being of sufficient length to bridge the space between said arms and to be inserted in said passage means, and
   (d) key actuated locking means within at least one of said arms to releasably engage said locking pipe near its end.

2. The security stand of claim 1 wherein said elongated locking pipe includes a solid metal cylindrical end having a detent-receiving recess therein.

3. The security stand of claim 1 wherein said base has transversely disposed across it, a channel guide to receive and guide the wheels of said motorcycle into position between said arms.

4. The security stand of claim 2 wherein each of said arms includes a hollow box section containing said cementitious material.

5. The security stand of claim 3 wherein said channel guide is provided with a stop means near one end thereof, to limit travel of said motorcycle.

6. The security stand of claim 4 wherein said base includes a hollow box section containing said cementitious material.

7. The security stand of claim 4 wherein said key actuated locking means includes a dead bolt lock concealed within at least one of said arms.

8. The security stand of claim 4 wherein each said arm is doubly angulated forming an elbow intermediate its length, said arm, near its base, forming an angle greater than 45° relative to the horizontal, and an angle less than 45° relative to said horizontal at said elbow.